United States Patent [19]
Biere et al.

[11] Patent Number: 5,547,565
[45] Date of Patent: Aug. 20, 1996

[54] FUEL/WATER SEPARATOR WITH ADAPTOR PLATE FOR DRAIN VALVE AND WATER DETECTOR

[75] Inventors: David A. Biere; O. Troy McConaughey; Gene W. Brown, all of Kearney, Nebr.

[73] Assignee: Baldwin Filters, Inc., Kearney, Nebr.

[21] Appl. No.: 350,262

[22] Filed: Dec. 5, 1994

[51] Int. Cl.$^6$ .................................................. B01D 27/08
[52] U.S. Cl. .......................... 210/86; 210/232; 210/248; 210/313; 210/444
[58] Field of Search .......................... 210/86, 232, 248, 210/312, 313, 440, 443, 444; 55/274, 355

[56] References Cited

U.S. PATENT DOCUMENTS

| | | | |
|---|---|---|---|
| 2,311,320 | 2/1943 | Williams | 210/440 |
| 2,333,890 | 11/1943 | Russell | 210/440 |
| 4,276,161 | 6/1981 | Matsui et al. | 210/86 |
| 4,502,955 | 3/1985 | Schaupp | 210/149 |
| 4,619,764 | 10/1986 | Church et al. | 210/248 |
| 4,624,779 | 11/1986 | Hurner | 210/312 |
| 5,236,579 | 8/1993 | Janik et al. | 210/313 |
| 5,322,624 | 6/1994 | Rogers et al. | 210/232 |

*Primary Examiner*—Matthew O. Savage
*Attorney, Agent, or Firm*—Leydig, Voit & Mayer, Ltd.

[57] ABSTRACT

The separator includes an all sheet metal shell having a bottom to which is secured a metal adaptor plate enabling a drain valve and a water detector to be attached to the bottom of the shell.

12 Claims, 4 Drawing Sheets

FUEL/WATER SEPARATOR WITH ADAPTOR PLATE FOR DRAIN VALVE AND WATER DETECTOR

BACKGROUND OF THE INVENTION

This invention relates generally to a filter and, more particularly, to a fuel filter such as a fuel/water separator for a diesel engine or the like. Such a separator typically comprises a metal shell which houses a filter element. Fuel flows through the filter element while water and other contaminants are stripped from the fuel and accumulate in the lower end portion of the separator. Periodically, the water and other contaminants are removed from the separator by opening a drain valve at the lower end of the separator. In some separators, a water detector extends upwardly into the separator and electrically signals when sufficient water has accumulated as to require draining of the separator.

A very commercially successful fuel/water separator is disclosed in Church et al U.S. Pat. No. 4,619,764. In that separator, the filter element is housed in a sheet metal shell while water is collected in a transparent or translucent plastic bowl removably attached to the lower end of the shell. The drain valve and the water detector are attached to the lower end of the bowl.

While separators of the type disclosed in the Church et al patent have experienced wide commercial success, such separators suffer several drawbacks which result primarily from the use of the plastic bowl. The initially transparent or translucent bowl quickly becomes opaque due to contact with diesel fuel and fuel additives. In severe cases, the plastic actually cracks or crazes. Heat causes the bowl to distort, and road hazards such as thrown rock or salt can puncture the bowl. Any or all of these weaknesses can lead to leaking of the separator, thereby contaminating the environment and endangering the safety of the vehicle operator.

Separators of the type disclosed in the Church et al patent also lack static and hydrodynamic strength. Such separators are prone to leakage whenever internal static pressure approaches 60 psi. and tend to fail after less than 50 cycles when subjected to pressure surges of 0–100 psi. at 2 Hz.

SUMMARY OF THE INVENTION

The general aim of the present invention is to provide a new and improved fuel/water separator having a drain valve and a water detector, the separator being of higher strength and experiencing a longer service life than prior separators of the same general type.

A more detailed object of the invention is to achieve the foregoing by providing a fuel/water separator in which the water is collected in the same high strength metal shell that houses the filter element, the shell being equipped with a unique adaptor plate which enables both a drain valve and a water detector to be attached to the shell.

The invention also resides in the relatively simple and inexpensive but yet rugged construction of the adaptor plate.

These and other objects and advantages of the invention will become more apparent from the following detailed description when taken in conjunction with the accompanying drawings.

Figure 1:
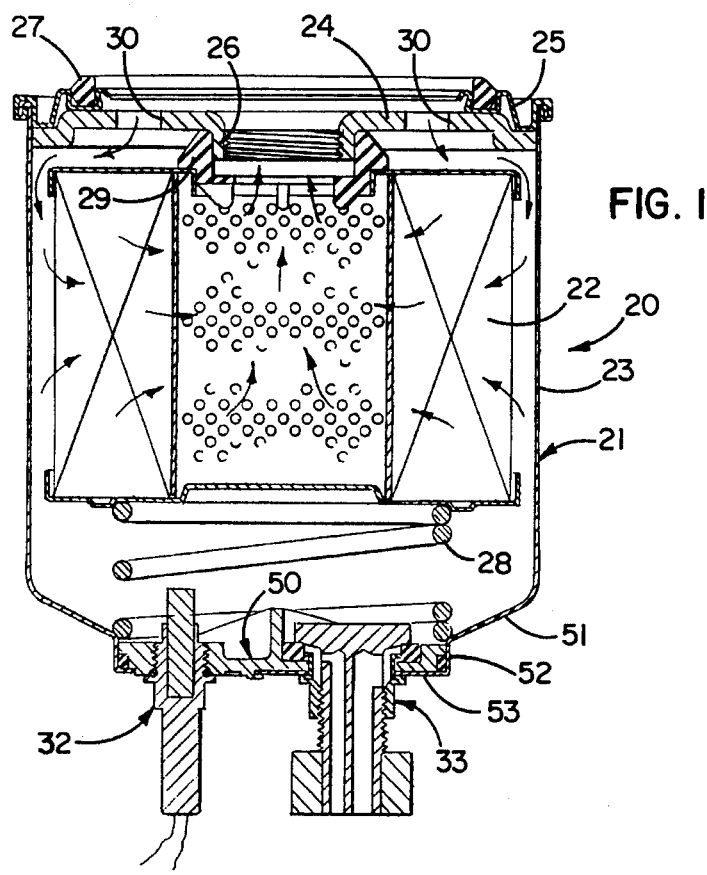
FIG. 1 is a cross-sectional view taken axially through one embodiment of a fuel/water separator equipped with a new and improved adaptor plate incorporating the unique features of the present invention.

While the invention is susceptible of various modifications and alternative constructions, certain illustrated embodiments hereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF THE PREFERRED EMBODIMENTS

For purposes of illustration, the invention has been shown in the drawings in conjunction with a fuel/water separator 20 of the type used with an internal combustion engine such as a diesel engine. The separator includes a vessel or shell 21 made of relatively heavy gage sheet metal and housing a filter element 22. During typical operation, fuel flows through the filter element while water and heavier molecular particles are separated therefrom and accumulate in the lower end portion of the shell.

More specifically, the shell 21 includes a generally cylindrical wall 23 with an open end which is closed by an end plate 24. The latter is attached to the shell by an annular retainer 25 which is seamed to the upper end portion of the shell. The retainer is formed with an internally threaded sleeve 26 which enables the separator 20 to be spun onto a mounting adaptor (not shown) of the engine, the retainer supporting an annular gasket 27 which seals against the adaptor. A coil spring 28 in the lower end portion of the shell engages the lower end of the filter element 22 and urges the upper end portion of the element into sealing engagement with a gasket 29 which encircles the sleeve 26.

Fuel from the tank flows into the separator 20 through angularly spaced inlet ports 30 in the plate 24, flows through the filter element 22, and then is supplied to the engine via the threaded sleeve 26. Water and other contaminants in the fuel are separated therefrom by the filter element and collect in the bottom of the shell 21. When the water reaches a predetermined level, a water detector 32 in the lower portion of the separator produces an electrical signal to activate a warning light in the cab of the vehicle. A drain valve 33 at the bottom of the separator then may be opened to enable removal of the accumulated water and other contaminants from the separator.

Figure 2:
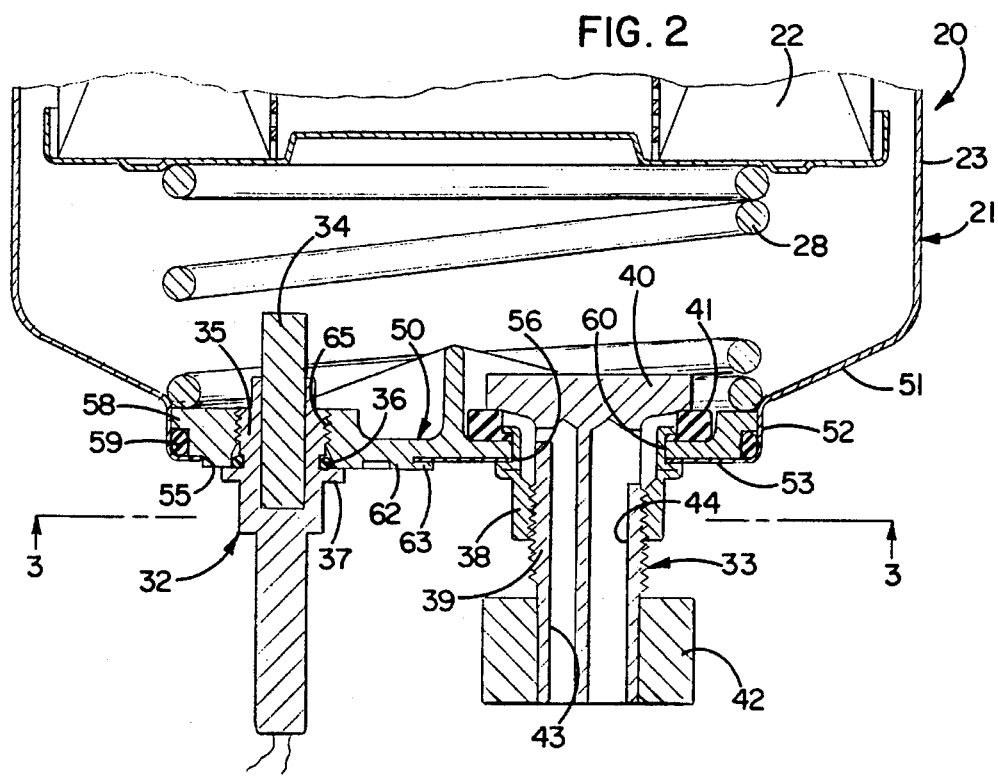
FIG. 2 is an enlarged view of certain components of the separator shown in FIG. 1.

The water detector 32 is supplied by the engine manufacturer and is of conventional design. The particular detector which has been shown includes a probe 34 (FIG. 2), a threaded neck 35, an O-ring seal 36 and a radially extending flange 37 which retains the seal. The particular drain valve 33 which has been shown is a self-venting valve of the type disclosed in Brown et al U.S. Pat. No. 5,144,978. It includes a fixed component or housing 38, a valve member 39 with a head 40, a gasket 41 against which the head seats when the valve is closed, and an operating knob 42 which is secured to the lower end of the valve member with a press fit. When the knob 42 is turned in an opening direction, the head 40 is lifted off of the gasket 41, air enters the shell 21 via a passage 43 in the valve member 39, and water drains from the shell through a passage 44 in the valve member.

In accordance with the present invention, a high strength adaptor plate 50 is secured to the lower end of the shell 21 to enable both the water detector 32 and the drain valve 33 to be attached to the shell. By virtue of the adaptor plate 50, the entire shell may be made of sheet metal, the separator 20 is capable of withstanding relatively high static and dynamic pressures, and the need for a plastic sump bowl is eliminated.

Figure 3:
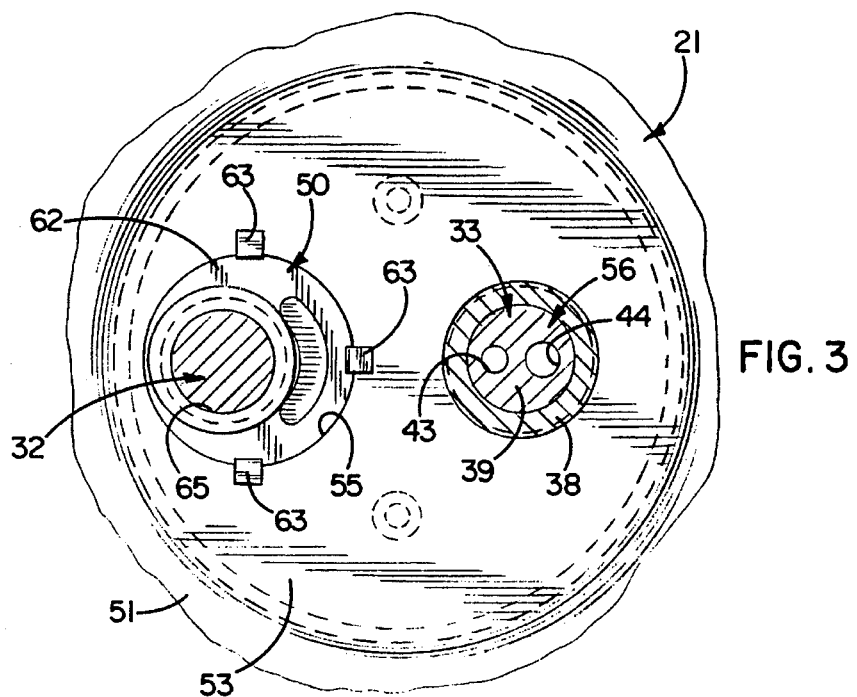
FIG. 3 is a fragmentary cross-section taken substantially along the line 3—3 of FIG. 2.

Before describing the adaptor plate 50 in detail, the lower or water outlet end portion of the shell 21 will be described. As shown most clearly in FIG. 2, a generally frustoconical and downwardly tapered wall section 51 is formed integrally with the lower end of the cylindrical wall 23 of the shell. A short cylindrical side wall 52 is integral with the lower end of the frustoconical wall section 51 and also is integral with the outer periphery of a generally radially extending bottom wall 53. The walls 52 and 53 coact to define a cylindrical pocket in the lower end portion of the shell, the diameter of the pocket being substantially less than the diameter of the main portion of the shell as defined by the wall 23. A large opening 55 (FIG. 3) and a smaller opening 56 are formed through the bottom wall 53 of the shell and, in this instance, the axes of the openings intersect a common diameter of the shell.

Figure 4:
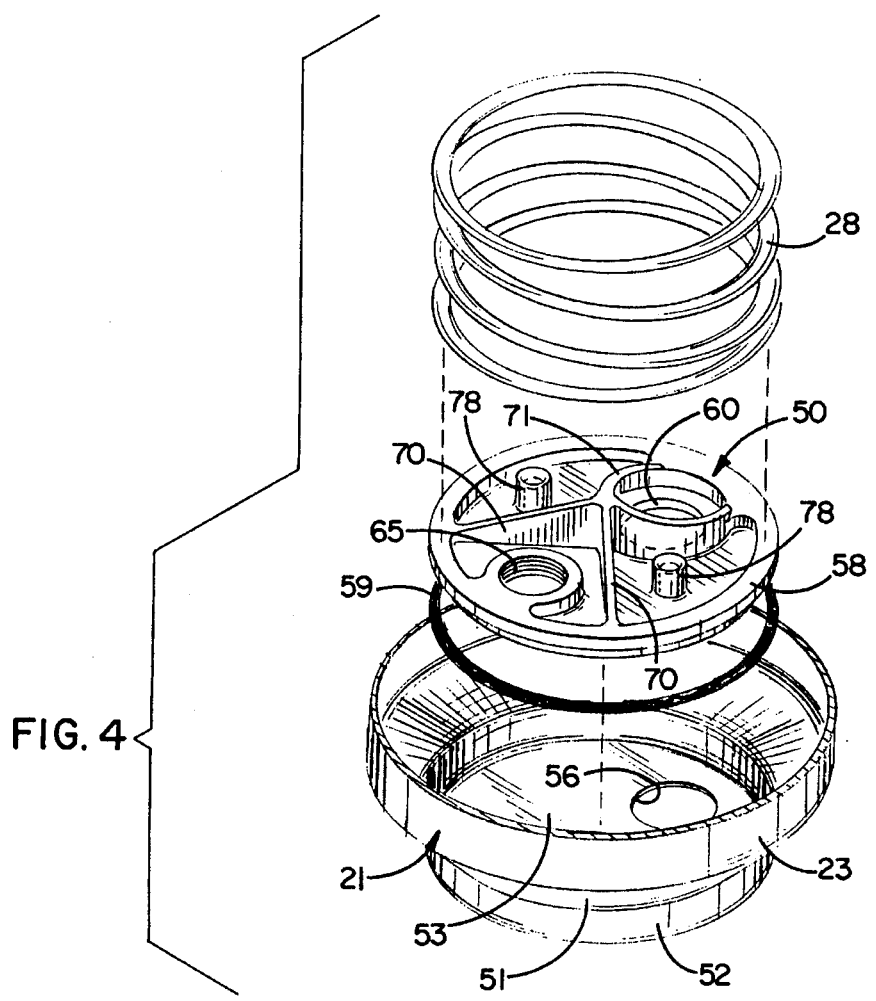
FIG. 4 is an exploded perspective view of certain components of the separator.
Figure 5:
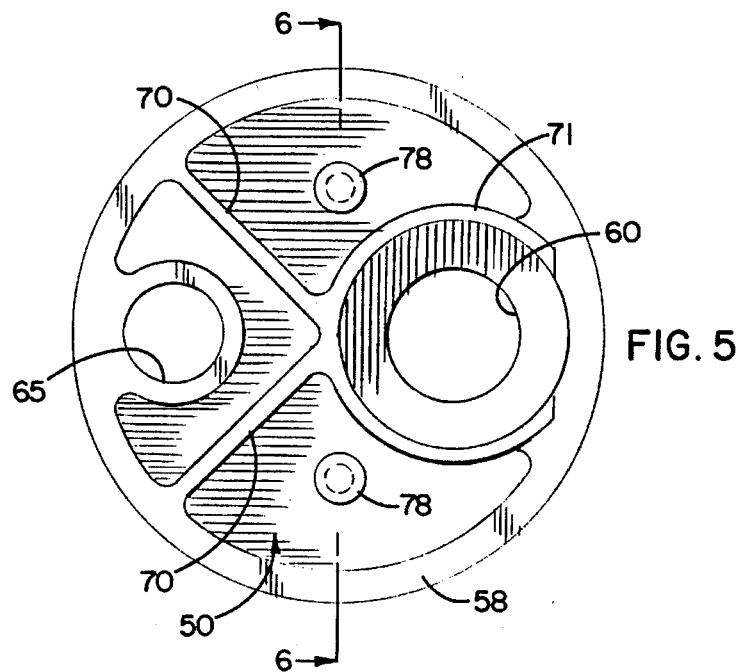
FIG. 5 is a top plan view of the adaptor plate.
Figure 6:
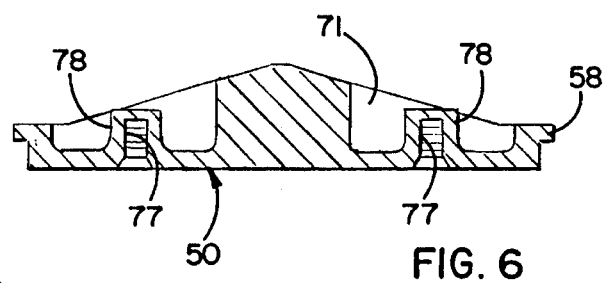
FIG. 6 is a cross-section taken substantially along the line 6—6 of FIG. 5.
Figure 7:
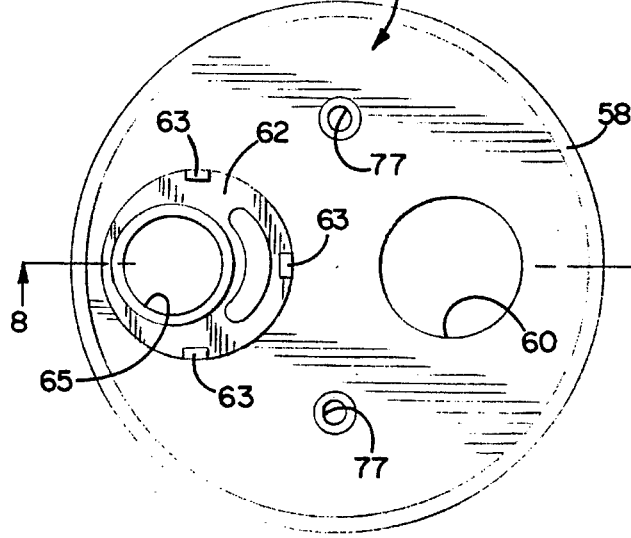
FIG. 7 is a bottom plan view of the adaptor plate.
Figure 8:
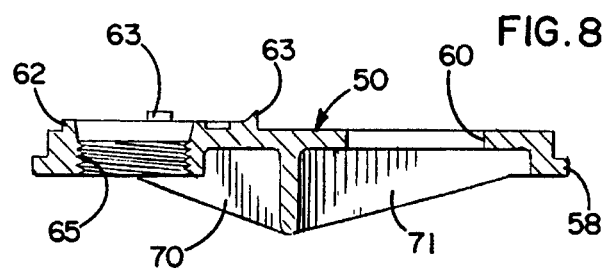
FIG. 8 is a cross-section taken along the line 8—8 of FIG. 7.

The adaptor plate 50 is preferably die cast from a suitable metal such as zinc alloy or aluminum alloy, although the plate could be machined from solid stock. Herein, the plate is circular and its outer periphery is formed with a radially outwardly extending flange 58 (FIG. 8) located at the upper side of the plate. An O-ring 59 (FIGS. 2 and 4) underlies the flange and establishes a seal between the plate 50 and the shell 21 near the junction of the side and bottom walls 52 and 53. The diameter of the flange is just slightly smaller than the diameter of the pocket defined by the side and bottom walls 52 and 53. Thus, the pocket serves as a pilot for the plate and helps restrain the plate radially.

Formed vertically through the plate 50 and aligned with the smaller opening 56 in the bottom wall 53 is an opening 60 having the same diameter as the opening 56. The gasket 41 is seated on the upper side of the plate 50 in encircling relation with the opening 60. The gasket is clamped in place by crimping the upper end portion of the housing 38 of the valve 33 in the manner disclosed in the aforementioned Brown et al patent, the crimping operation also serving to secure the valve housing to the bottom wall 53 and the plate 50 with the upper end portion of the housing located in the openings 56 and 60.

Figure 9:
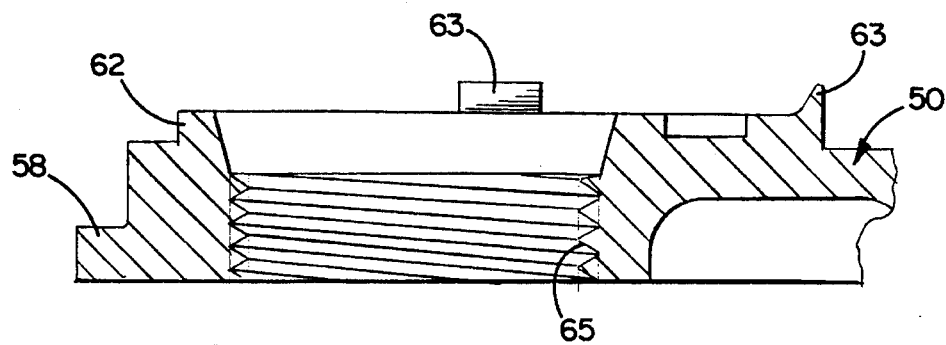
FIG. 9 is an enlarged view of a portion of the adaptor plate shown in FIG. 8.

Formed on the lower side of the plate 50 in spaced relation with the opening 60 is a boss 62 (FIGS. 2 and 9) which projects downwardly through the opening 55 in the bottom wall 53 of the shell 21. Three angularly spaced lugs 63 are formed on the boss 62 and initially extend downwardly therefrom. In the embodiment shown in FIGS. 1–9, the lugs are peened or staked over against the bottom wall 53 around the margin of the opening 55 after the boss 62 has been inserted through the opening. Staking of the lugs clamps the plate 50 axially to the bottom wall 53.

A second opening 65 (FIGS. 2 and 9) is formed vertically through the plate 50 and specifically through the boss 62 thereof and thus is aligned generally with the opening 55 in the bottom wall 33. The opening 65 is threaded so as to receive the neck 35 of the water detector 32. When the latter is tightened in the opening 65, its flange 37 clamps against the lower side of the boss 62 and causes the O-ring 36 to seal the opening 65.

The upper side of the plate 50 is formed with a rib structure which serves to stiffen the plate and which also serves as a pilot for the lower end portion of the spring 28. As shown most clearly in FIG. 5, the rib structure includes two upwardly projecting and radially extending ribs 70, and further includes a generally circular rib 71 encircling the hole 60 and joining the ribs 70 at the apex of the V. The ribs extend upwardly into the lower end portion of the spring 28 to hold the latter in a centered position on the plate 50.

Assembly of the separator 20 is effected by placing the gasket 41 on the plate 50 adjacent the opening 60 and by inserting the valve housing 38 through the opening. The subassembly then is placed on a fixture (not shown) in an inverted position, and the O-ring 59 is placed on the flange 58. Thereafter, the bottom wall 53 of the shell 21 is seated against the O-ring 59 with the valve housing 38 projecting through the opening 60 and with the boss 62 projecting through the opening 55. The lugs 62 then are peened over and, in the same operation, the valve housing 38 is crimped to the bottom wall 53 and the plate 50. The valve member 39 then may be inserted into the shell 21 from the upper end thereof and threaded into the housing 38, after which the knob 42 may be pressed onto the valve member. The spring 28, the filter element 22, the gasket 29, the plate 24, the retainer 25 and the gasket 27 then may be assembled with the shell in a conventional manner. The water detector 32 is installed in the tapped opening 65 after the separator 20 has been attached to the engine.

Because of the die cast adaptor plate 50 and because the entire shell 21 of the separator 20 is made of metal, the separator possesses superior strength. The separator is capable of withstanding internal static pressure up to about 200 psi. and can survive fluid pressure surges of 0–100 psi. at 2 Hz for 50,000 cycles without leakage. The separator also can withstand high temperatures, chemical attack and damage from impact.

Figure 10:
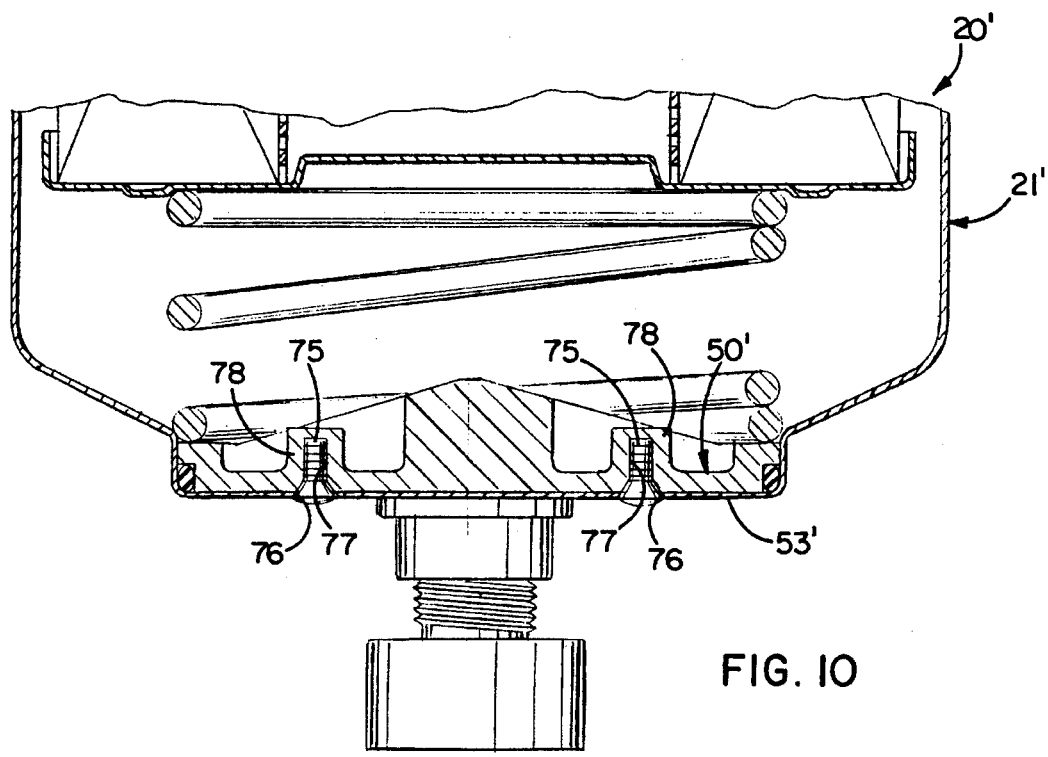
FIG. 10 is a view generally similar to FIG. 1 but shows a modified fuel/water separator.

A modified separator 20' has been shown in FIG. 10 in which parts corresponding to those of the first embodiment have been indicated by the same but primed reference numerals. In the separator 20', the adaptor plate 50' is secured to the bottom wall 53' of the shell 21' by two screws 75 which extend through holes 76 in the bottom wall. The screws are threaded into blind holes 77 formed in bosses 78 on the upper side of the adaptor plate. The same adaptor plate may be provided both with holes 77 and lugs 63, and one or the other means of securing the plate to the shell may be used. The plate also may be secured to the shell by means of an externally applied swage ring (not shown).

It will be appreciated that the opening 65 may be easily modified to accept detectors 32 with necks 35 having threads of different diameter, pitch or length. Also, the opening 60 may be easily modified to accommodate different types of drain valves. The adaptor plate 50, 50' may be used universally with shells 21, 21' ranging upwards in outside diameter from about 3".

We claim:

1. Apparatus for separating water from fuel, said apparatus comprising a sheet metal shell of circular cross-section and having a filter element therein, means for admitting fuel into said shell for flow through said filter element and for enabling filtered fuel to flow from said shell, said shell having a water outlet end portion defined at least in part by an end wall, a metal adaptor plate formed separately of said shell and located in said shell immediately adjacent said end wall, means for rigidly fixing said adapter plate to said shell, wherein said end wall defines a cylindrical pocket of about the same size as the adaptor plate to allow the adaptor plate to closely fit in the cylindrical pocket, a gasket compressed between the adaptor plate and the cylindrical pocket for establishing a liquid-tight seal between said adaptor plate and said shell, a set of coaxially aligned first openings in said end wall and said adaptor plate, a drain valve extending through said first openings and having a housing fixed securely to said end wall and said adaptor plate for joining the end wall to the adaptor plate, a set of coaxially aligned second openings in said end wall and said adaptor plate, the second opening in said adaptor plate being threaded with a thread size compatible with and capable of threadably receiving an electrical water detector.

2. Apparatus as defined in claim 1 further including a spring sandwiched between said filter element and said adaptor plate and urging said filter element away from said adaptor plate, and means on said adaptor plate for holding said spring in a centered position relative to said adaptor plate.

3. Apparatus as defined in claim 1 wherein said means for rigidly fixing said adapter plate to said shell comprises screws extending through holes in said end wall and threaded into blind holes in said adaptor plate.

4. Apparatus as defined in claim 1 in which the adaptor plate has an outwardly extending flange and in which the gasket comprises an O-ring trapped between the flange and the pocket for establishing said liquid-tight seal.

5. Apparatus as defined in claim 1 in which the housing of the drain valve is crimped after insertion into the set of aligned first openings to secure the adaptor plate to the end wall.

6. Apparatus as defined in claim 1 wherein axes of the respective sets of openings are both offset from the center of the cylindrical pocket.

7. Apparatus as defined in claim 1 wherein the adaptor plate has a boss aligned with the second opening in the end plate for serving as a pilot.

8. Apparatus for separating water from fuel, said apparatus comprising a sheet metal shell of circular cross-section and having a filter element therein, means for admitting fuel into said shell for flow through said filter element and for enabling filtered fuel to flow from said shell, said shell having a fuel outlet end portion and a water outlet end portion, the water outlet end portion of said shell being of smaller diameter than the fuel outlet end portion and being defined by an annular side wall and by an end wall integral with said side wall whereby said walls coact to form a generally cylindrical pocket, a metal adaptor plate formed separately of said shell and located in said pocket, means for rigidly securing said adaptor plate to said shell, means for establishing a liquid-tight seal between said adaptor plate and at least one of said walls, a set of coaxially aligned first openings in said end wall and said adaptor plate, a drain valve extending through said first openings and having a housing fixed securely to said end wall and said adaptor plate, a set of coaxially aligned second openings in said end wall and said adaptor plate, the second opening in said adaptor plate being threaded with a thread size compatible with and capable of threadably receiving an electrical water detector, said securing means comprising angularly spaced lugs formed integrally with said adaptor plate, extending through said second opening in said end wall, and staked to said end wall.

9. Apparatus as defined in claim 8 in which said adaptor plate includes a boss projecting through said second opening in said end wall, said second opening in said adaptor plate being formed through said boss.

10. Apparatus for separating water from fuel, said apparatus comprising a sheet metal shell of circular cross-section and having a filter element therein, means for admitting fuel into said shell for flow through said filter element and for enabling filtered fuel to flow from said shell, said shell having a water outlet end portion defined at least in part by an end wall, a metal adaptor plate formed separately of said shell and located in said shell immediately adjacent said end wall, wherein said end wall defines a cylindrical pocket of about the same size as the adaptor plate to allow the adaptor plate to closely fit in the cylindrical pocket, a gasket compressed between the adaptor plate and the cylindrical pocket for establishing a liquid-tight seal between said adaptor plate and said shell, a pair of sets of coaxially aligned openings in said end wall and said adaptor plate, said sets of openings being offset from the center of the adaptor plate, and means associated with said sets of openings for securing the adaptor plate to the end wall with said gasket in a compressed state.

11. Apparatus as defined in claim 10 in which the means joining the adaptor plate to the end wall comprises spaced lugs formed integrally with said adaptor plate, extending through one of said openings in said end wall and staked to the end wall.

12. Apparatus as defined in claim 10 in which the means securing the adaptor plate to the end wall comprises a housing extending through one of said openings, said housing having a flange which engages the end wall, and crimped adjacent the adaptor plate for joining the end wall and the adaptor plate.

* * * * *